(No Model.)  2 Sheets—Sheet 1.
H. M. PIERCE.
PROCESS OF AND APPARATUS FOR THE RECOVERY OF TURPENTINE AND OTHER WOOD PRODUCTS AND FOR THE MANUFACTURE OF CHARCOAL.
No. 277,505.  Patented May 15, 1883.
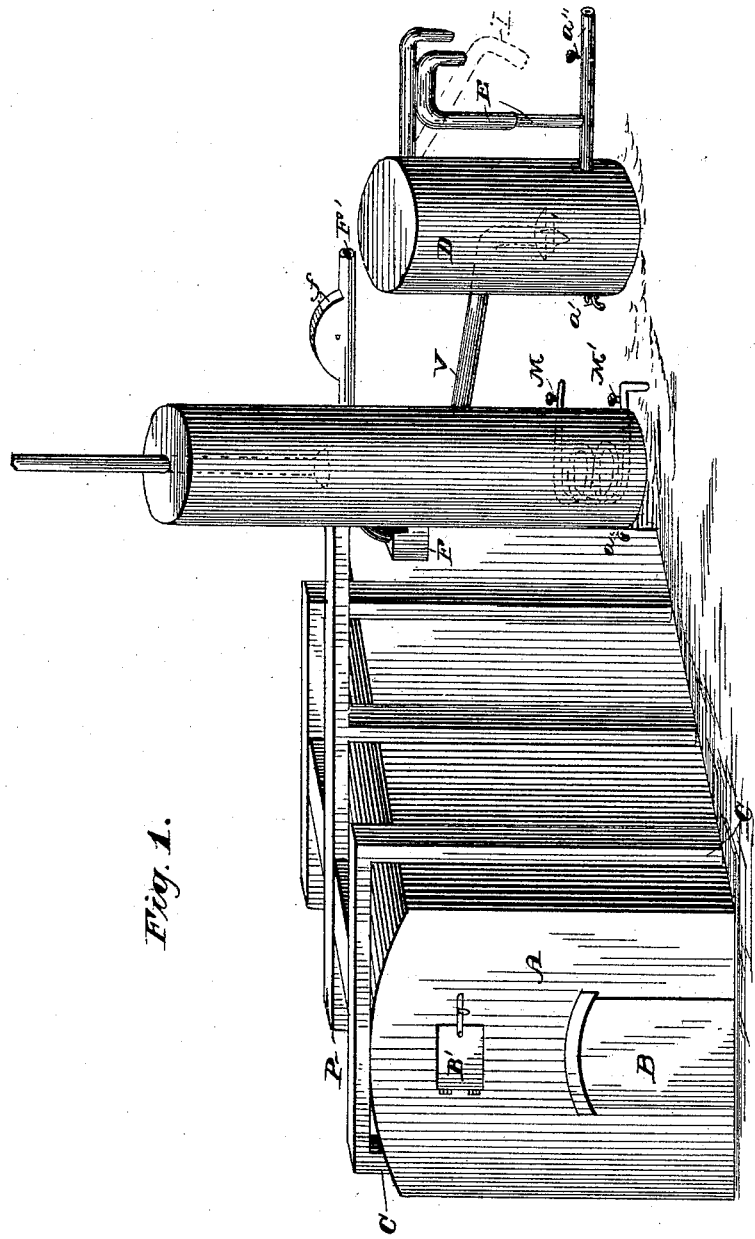

(No Model.) 2 Sheets—Sheet 2.
H. M. PIERCE.
PROCESS OF AND APPARATUS FOR THE RECOVERY OF TURPENTINE AND OTHER WOOD PRODUCTS AND FOR THE MANUFACTURE OF CHARCOAL.
No. 277,505. Patented May 15, 1883.
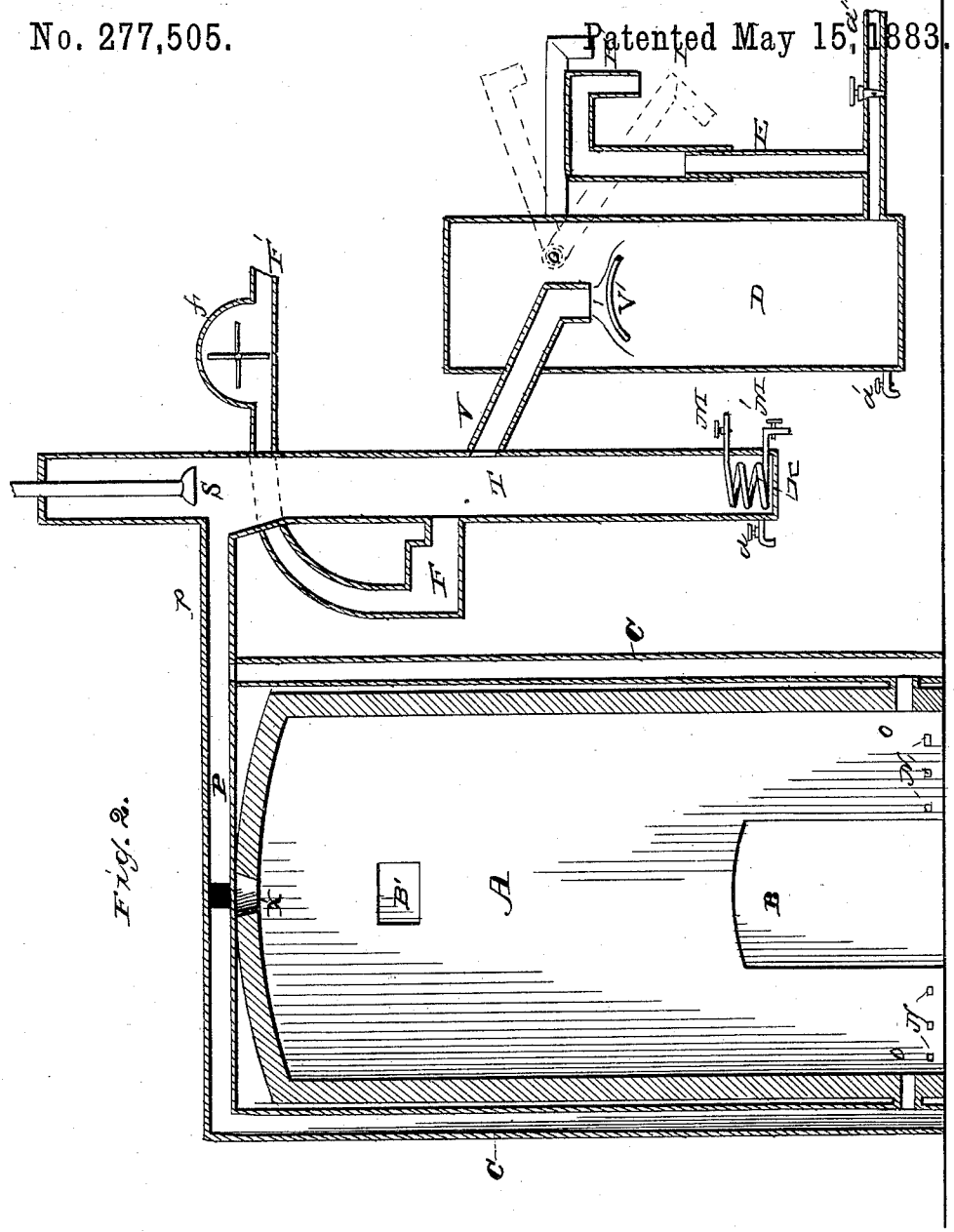

UNITED STATES PATENT OFFICE.

HENRY M. PIERCE, OF CHICAGO, ILLINOIS.

PROCESS OF AND APPARATUS FOR THE RECOVERY OF TURPENTINE AND OTHER WOOD PRODUCTS AND FOR THE MANUFACTURE OF CHARCOAL.

SPECIFICATION forming part of Letters Patent No. 277,505, dated May 15, 1883.

Application filed November 25, 1882. (No model.)

*To all whom it may concern:*

Be it known that I, HENRY M. PIERCE, a citizen of the United States, residing at Chicago, in the county of Cook and State of Illinois, have invented certain new and useful Improvements in Processes of and Apparatus for the Recovery of Turpentine and other Wood Products and for the Manufacture of Charcoal; and I do hereby declare the following to be a full, clear, and exact description of the same, reference being had to the accompanying drawings, wherein—

Figure 1 is a perspective view of devices embodying my invention, and Fig. 2 is a vertical section of the same.

Like letters refer to like parts wherever they occur.

The object of the present invention is to provide a method and means for the economical recovery of wood products and the manufacture of charcoal, or, in other words, to obtain the greatest yield at the least expense of operating. It has more especial reference to the recovery of turpentine, resins, &c., from the pine woods, firs, &c. The common custom heretofore has been to obtain the turpentine and rosin by tapping the tree and distilling the exudation; but by such a method only a small per cent. of such products is obtained, and of late years the lumber has become so much more valuable for timber that the manufacture of turpentine and charcoal has been in a great measure abandoned in many places. By my method and means the yield of turpentine, rosin, and charcoal is so largely increased, or, in other words, so little loss results in manufacturing, that such woods will be equally if not more profitably utilized in the manufacture of said products.

I will now proceed to describe my invention, so that others skilled in the art to which it appertains may apply the same. I will first describe apparatus suitable for the purpose, and then the method of operation.

In the drawings, A indicates a carbonizing-chamber, which, so far as the method is concerned, may be of any closed chamber, provided with an exit-pipe for gases, vapors, &c. In the present instance it is a kiln which varies from those in common use in the following particulars: In lieu of the usual openings for escape of gases, vapors, &c., I provide a series of flues, C, arranged at intervals, which communicate with the kiln at or near its base, and with each other or a common conduit, P, at a point preferably above the roof of the kiln or carbonizing-chamber. This kiln is provided with charging-doors, B B', air ducts or ports N N around its base, and the usual firing-port, X. Several of such carbonizing-chambers may be employed, and will all communicate by flues C with the common conduit P. The conduit P communicates by a pipe, *p*, with a spray-condenser, T, delivering the gases, vapors, &c., into the head or upper portion thereof. This condenser T is preferably a cylindrical vertical chamber provided at its lower extremity with a draw-off cock, *a*, for the withdrawal of tar, rosin, &c., and with a steam-coil, *k*, (which has its inlet and exit cocks M M',) adapted to heat and liquefy any substances which may become too thick to be drawn off through draw-off cock *a*. At a suitable height in condenser T is provided an exit-pipe, V, for fluids, which delivers into a separator, D, and just above said exit-pipe V is a gas-exit pipe leading to a gas-chamber, F, whence a pipe, F', conducts the uncondensed gases either to a gasometer or a furnace, as preferred. The furnace may be that of the boiler from which power for the works is obtained. The gas, if stored in a gasometer, may be curbureted and utilized for lighting purposes. If desired, a fan, *f*, may be placed in the pipe F' to gather and retire the uncondensed gases.

The object to be attained in using a spray-condenser rather than any other form is to collect and float over the oily matters and such as are miscible with water without contaminating the same, and at the same time to separate and precipitate the tarry and resinous matters. The condenser T communicates with the separator by means of pipe V.

D indicates a separator, which is also by preference of the form of a vertically-arranged closed cylinder, although any other form may be adopted at will. In the upper portion of the same, and arranged just below the delivery end of induction-pipe, is a deflector, V', which receives and spreads the incoming liquids, so as to prevent the formation of currents in the separator and facilitate the separation of the oily matters from the water. At the upper portion of the separator, and communicating therewith at the oil-level, is a draw-off pipe, I, which is provided with a swivel-joint, so that it can be raised or lowered to vary the height at which the oil shall be drawn off from the separator, and near the bottom of the separator, at one side, is a draw-off cock, $a'$, for removing sediment. At the opposite side of the separator is a short pipe, $a''$, provided with a stop-cock through which all the fluid may be drawn from the separator, if desired; but as it is desirable to trap off the water continuously, I arrange on pipe $a''$ a vertical siphon branch, E, provided with a sliding section, E', (a swivel-joint will answer very well,) which can be raised or lowered to maintain the water-level in separator D at any desired height.

My method of operation consists in recovering the turpentine or oily matters and the resinous and tarry matters from the woods by, first, distilling or carbonizing the wood, so as to drive over the vapors and volatile matters; secondly, subjecting such vapors to the action of a water-spray, so as to separate the oily matters and those miscible with water from the tarry and resinous matters, which latter are precipitated, and, finally, siphoning off the oily and aqueous matters; and it may be applied by means of the apparatus specified, in the following manner:

The kiln A is filled with wood through the doors B B', which are then closed and luted, and the contents of the kiln fired through the opening X, the air to support the slow combustion being admitted through the air-inlets N N, around the base of the kiln. The gases, vapors, &c., which are evolved from the wood enter the flues C, pass thence into conduit P, and by pipe $p$ to the condenser T. The pressure in the kiln is sufficient to cause the steady movement of the gases to the condenser. The vapors, gases, &c., on being subjected to the spray, separate into tarry and resinous elements, which precipitate, and may be drawn off through $a$, oily matters, which float upon the surface of the water in the condenser T, and miscible matters, the uncondensed gases passing to gas-chamber F, whence they may be drawn through pipe F', as before specified. If the tarry and resinous matters become too much chilled or too thick to be drawn off by the cock $a$, steam may be admitted to coil K in order to liquefy the same. The water and oily matters pass from the condenser T through pipe V to separator D, falling upon the deflector V', by which the same are spread out, so as to prevent the formation of currents and facilitate the separation of the oil and water. The oil will rise to the upper portion of the separator, whence it is trapped off by pipe I, set at the desired level, and the water which will occupy the lower portion of the separator will flow constantly from the same through siphon-pipe E, which may also be set so as to regulate the height of water maintained in the separator. The oil and the water thus separately gathered, as well as the tarry matters and resins recovered from the condenser, may be submitted to subsequent distillation, refining, or other treatment, as desired or required.

I am aware that fluids have heretofore been separated by decantation, and that spray condensers have been employed in condensing oils in the distillation thereof, and do not herein claim such devices or processes, broadly; but I am not aware that in the carbonization or destructive distillation of woods a spray-condenser has been used, so as not only to condense the turpentine, but at the same time free it from acids and from matters miscible with water, and by trapping off the liquids at different levels recovering the valuable products by a continuous process, as herein specified; and, therefore,

Having thus described my invention, what I claim, and desire to secure by Letters Patent, is—

1. The method herein described for recovering oils, resin, &c., from wood products, which consists in subjecting the vapors, &c., arising from the distillation of the wood to the action of a spray of water, whereby the oils and resinous matters are separated, and then decanting or drawing off the supernatant oily matter, substantially as and for the purpose specified.

2. A kiln or carbonizing-chamber provided with air-inlet and flues for the escape of the vapors, &c., generated in the kiln, in combination with a spray-condenser, substantially as and for the purpose specified.

3. A kiln or carbonizing-chamber provided with air-inlet and flues for the escape of the vapors generated in the kiln, in combination with a spray-condenser having a gas-chamber and gas-exit pipe, substantially as and for the purpose specified.

4. A separating-chamber or separator provided with two adjustable draw-off or siphon pipes arranged at different levels, substantially as and for the purpose specified.

5. A separating-chamber provided with an induction-pipe, a deflector arranged below the delivery end of said pipe, a draw-off pipe communicating with the upper portion of the separating-chamber, and a siphon-pipe communicating with the lower portion of the separating-chamber, substantially as and for the purpose specified.

6. A spray-condenser having a steam-coil arranged therein, and provided with a gas-eduction pipe, in combination with a separator having two draw-off pipes arranged at different levels, and a conduit connecting the condenser and separator, substantially as and for the purposes specified.

7. The combination of the kiln having air-inlets and flues for the escape of vapors, &c., with a spray-condenser having a gas-exit pipe, and a separator having two draw-off pipes arranged at different levels, substantially as and for the purpose specified.

In testimony whereof I affix my signature, in presence of two witnesses, this 20th day of November, 1882.

HENRY M. PIERCE.

Witnesses:
F. W. RITTER, Jr.,
H. B. MOULTON.